Sept. 20, 1949.　　　　B. M. SWEETSER　　　2,482,133
BONDING MACHINE
Filed March 23, 1948　　　　　　　　　　7 Sheets-Sheet 1
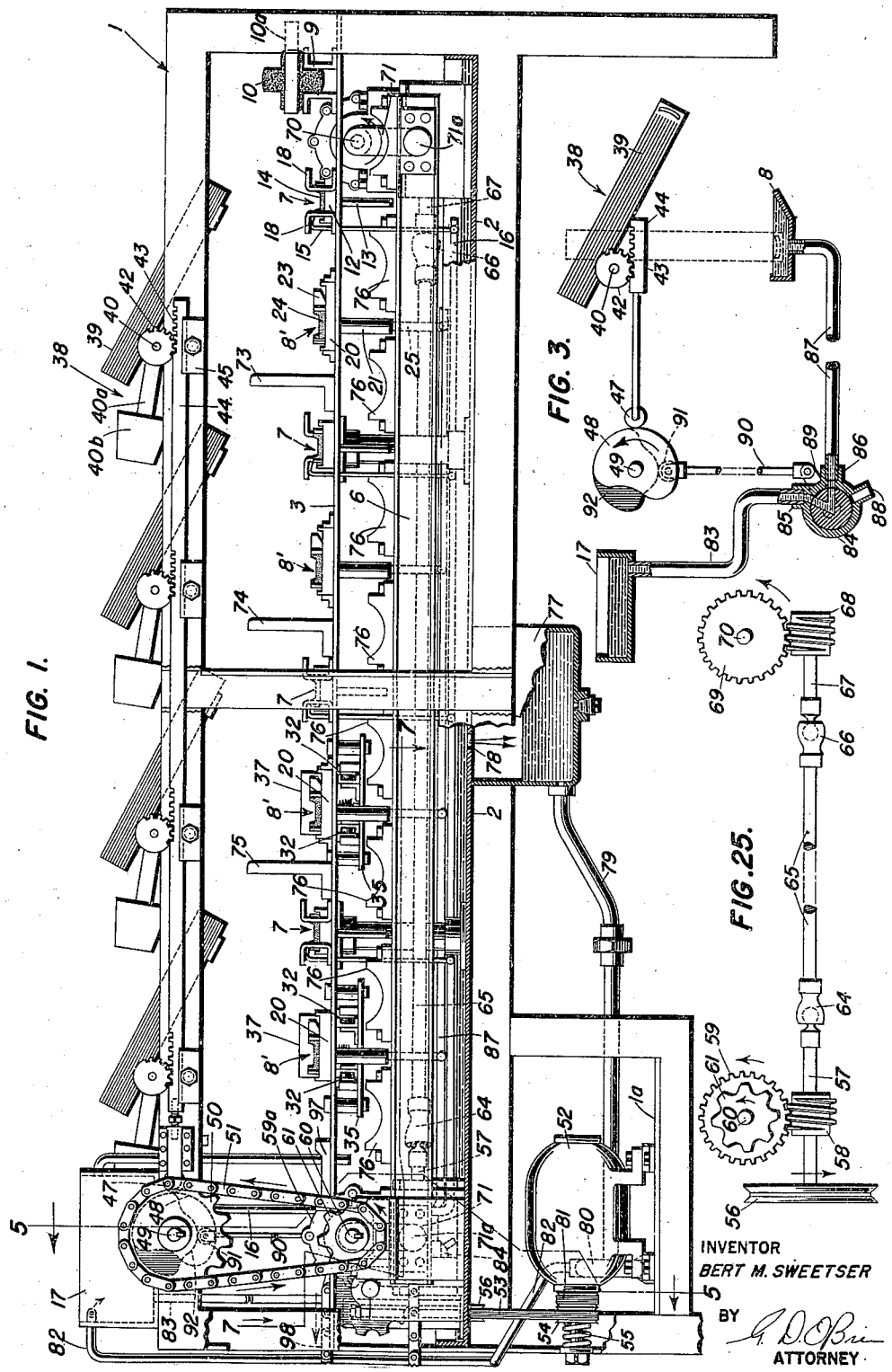
INVENTOR
BERT M. SWEETSER
BY
ATTORNEY

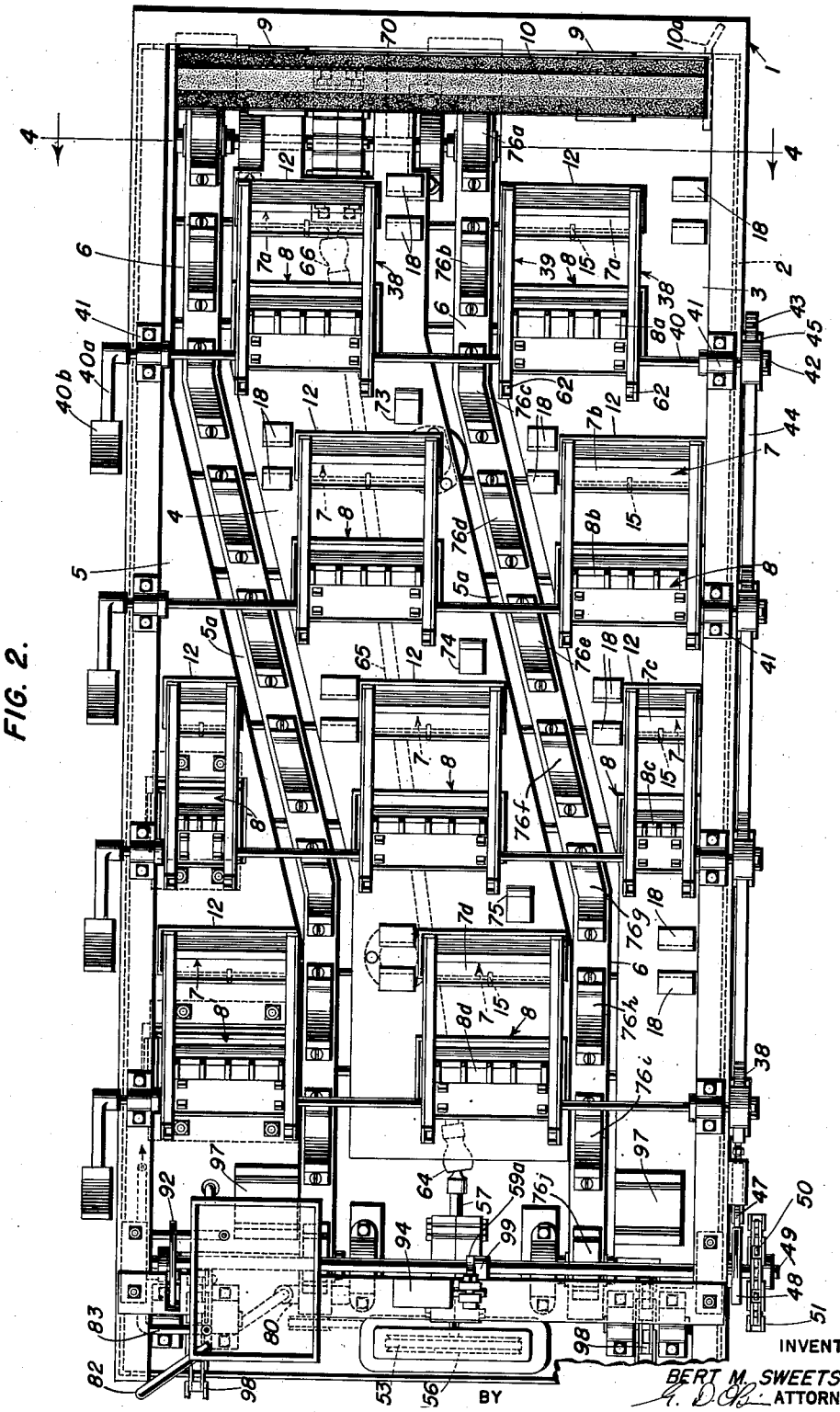

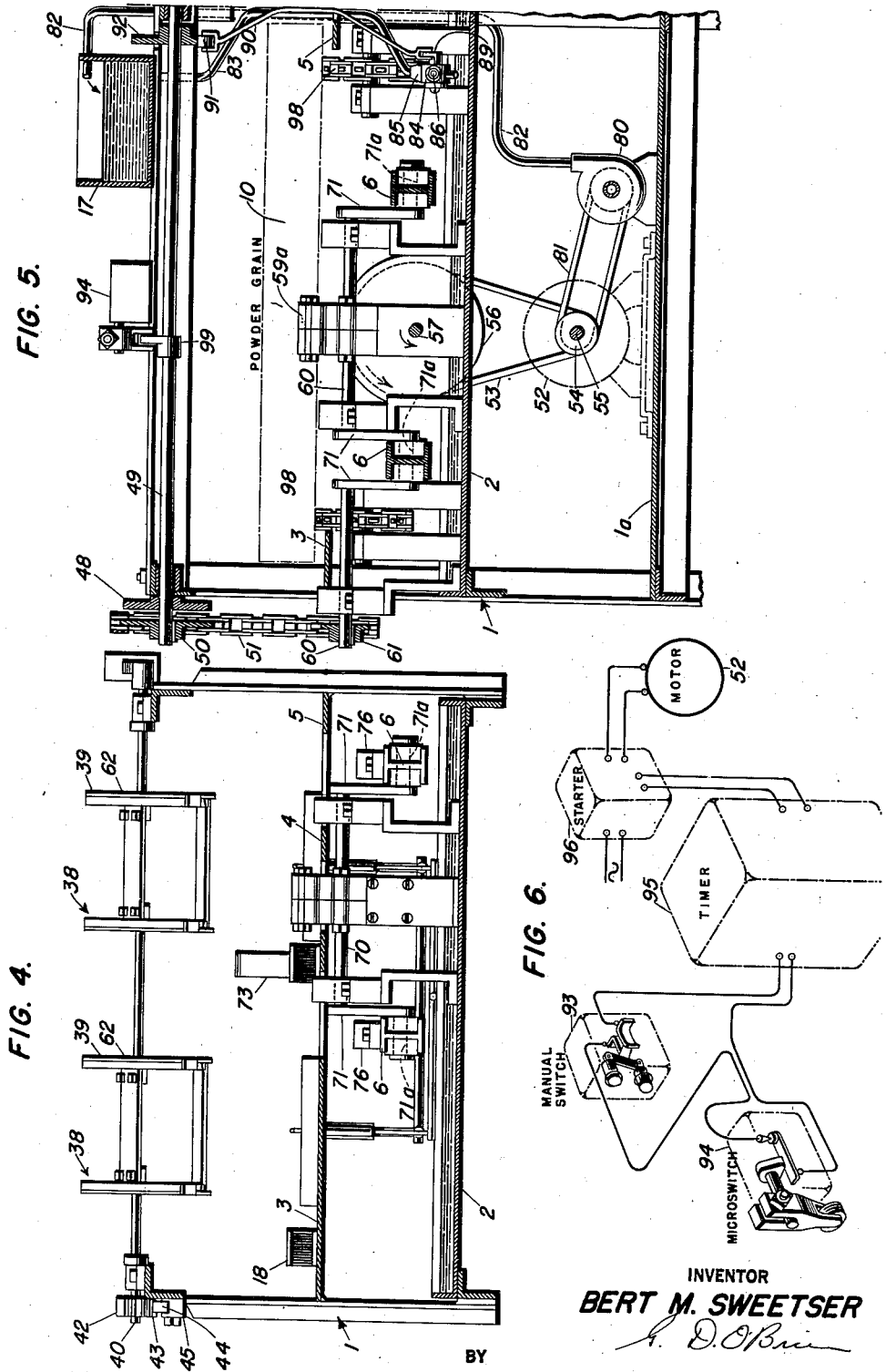

Sept. 20, 1949.  B. M. SWEETSER  2,482,133
BONDING MACHINE
Filed March 23, 1948  7 Sheets-Sheet 4
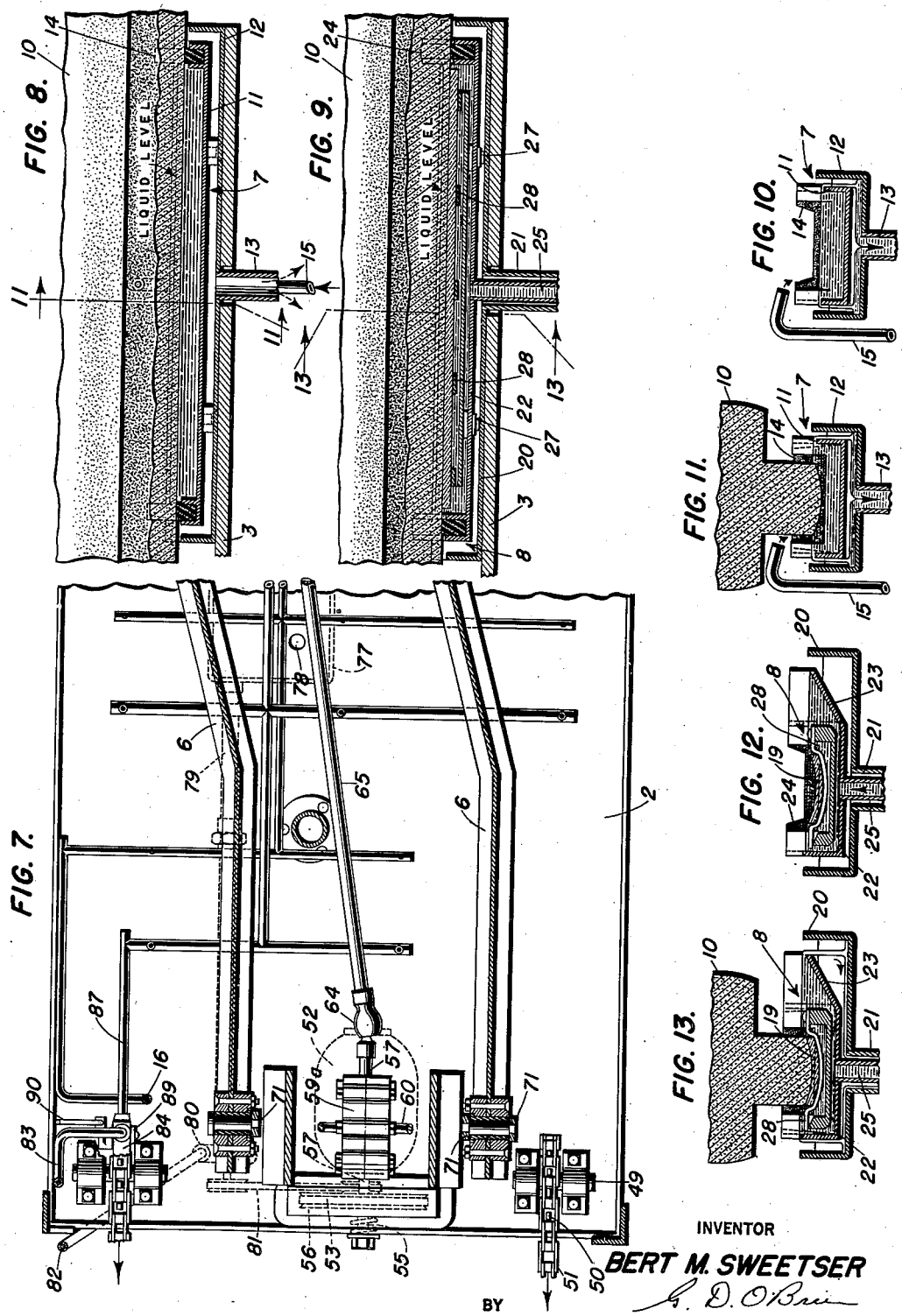
INVENTOR
BERT M. SWEETSER
BY
ATTORNEY Sept. 20, 1949.  B. M. SWEETSER  2,482,133
BONDING MACHINE
Filed March 23, 1948  7 Sheets-Sheet 5
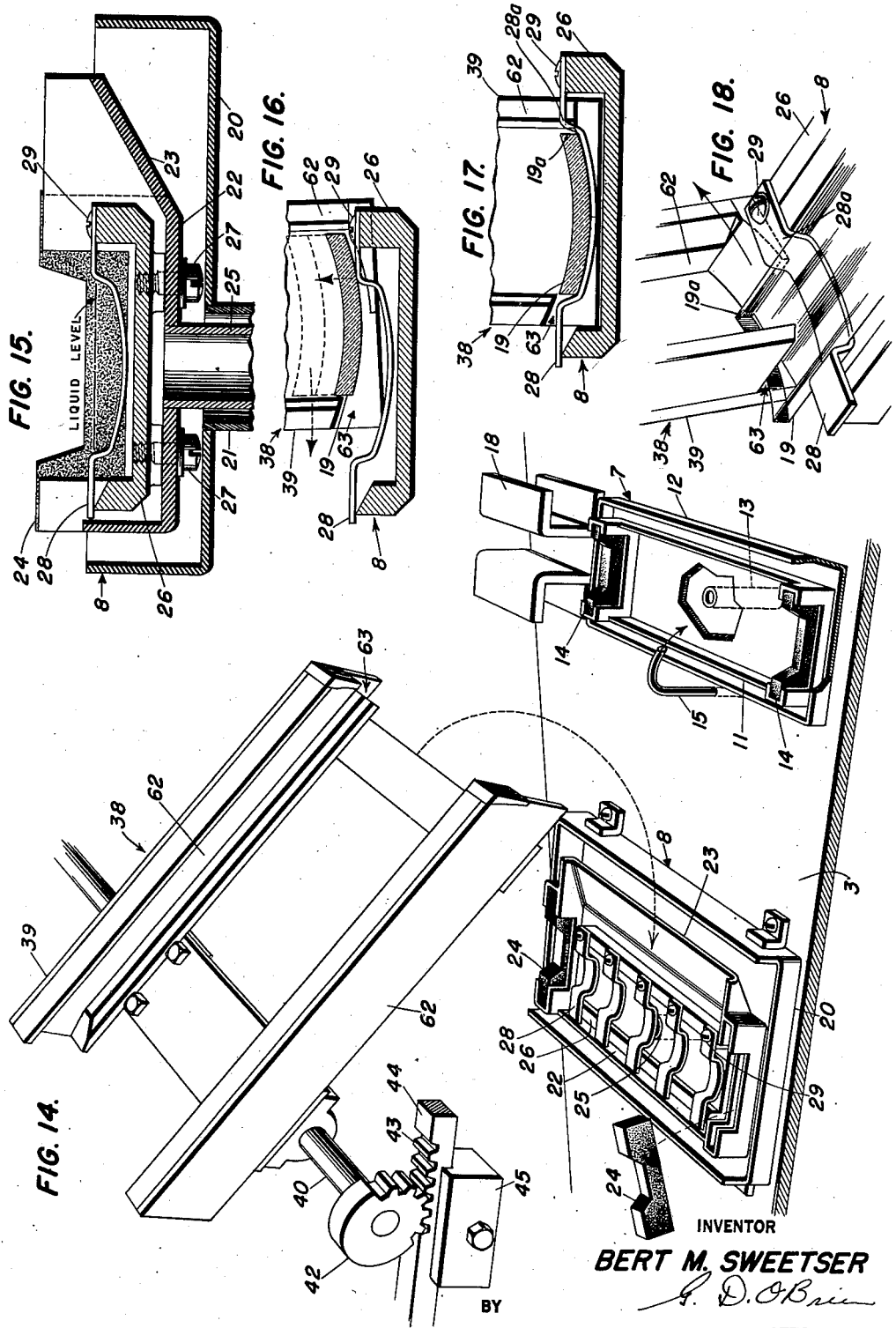
INVENTOR
BERT M. SWEETSER
BY
ATTORNEY

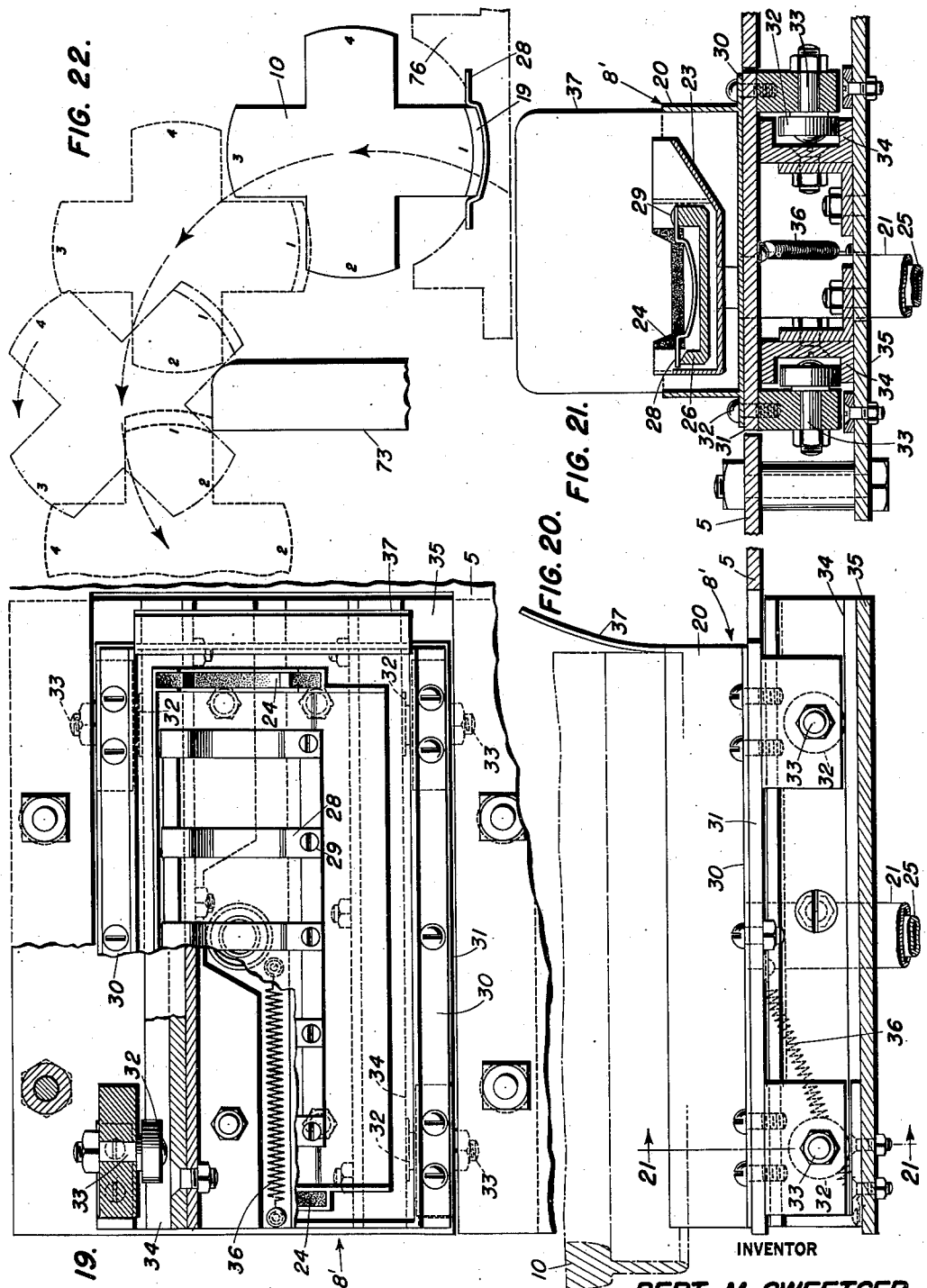

Sept. 20, 1949.  B. M. SWEETSER  2,482,133
BONDING MACHINE
Filed March 23, 1948  7 Sheets-Sheet 7
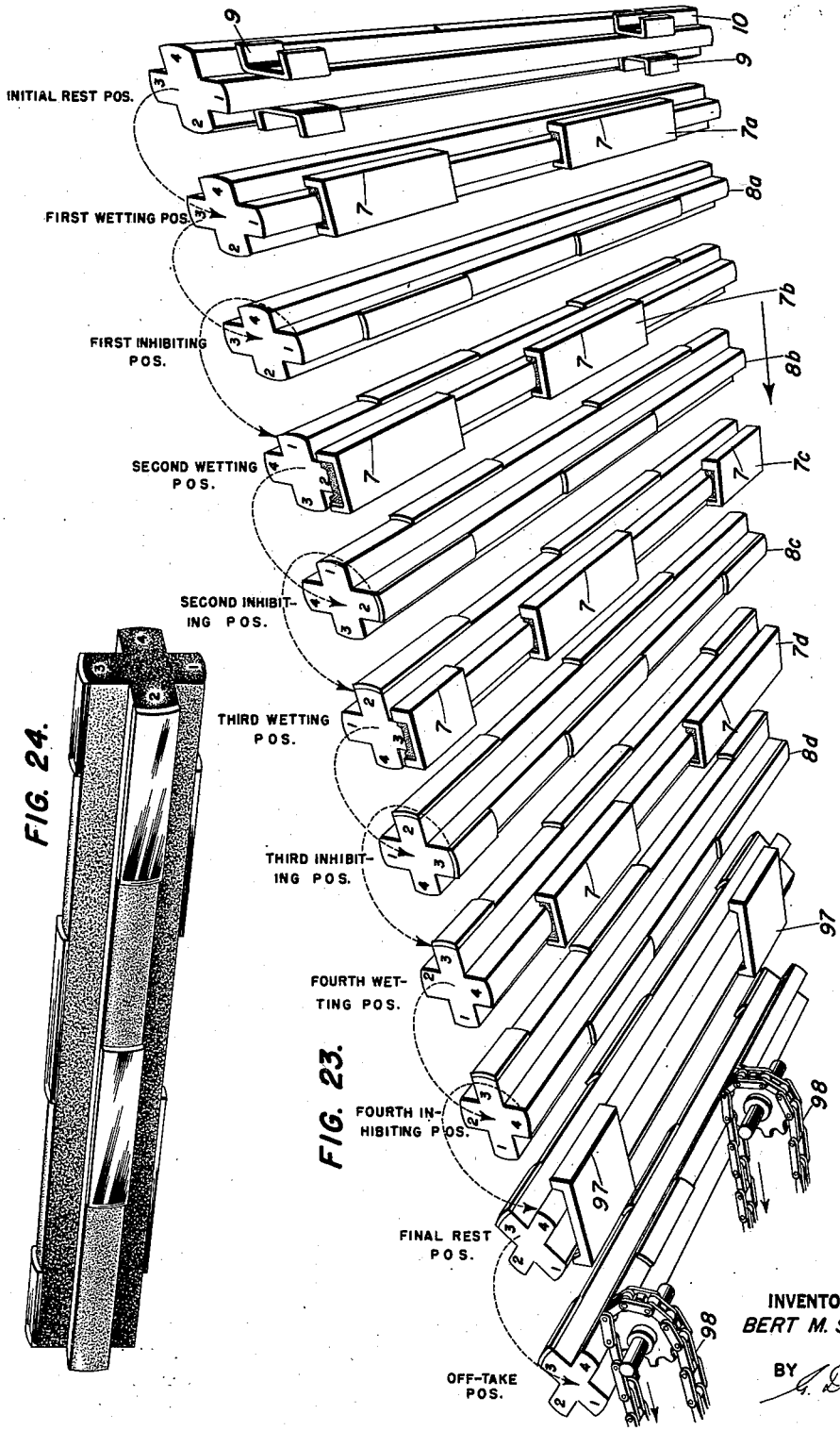
INVENTOR
BERT M. SWEETSER
BY
ATTORNEY Patented Sept. 20, 1949

2,482,133

UNITED STATES PATENT OFFICE 2,482,133

BONDING MACHINE

Bert M. Sweetser, Glendale, Calif.

Application March 23, 1948, Serial No. 16,602

32 Claims. (Cl. 154—1.6)

(Granted under the act of March 3, 1883, as amended April 30, 1928; 370 O. G. 757)

This invention relates to improvements in apparatus for bonding materials together and is particularly directed to an improved device for bonding inhibitor strips on propellant grains used in rocket motors.

It has been found necessary to place a plurality of inhibitor strips in a particular pattern along the side walls of propellant grains having a cruciform cross section in order to obtain a constant burning grain in a jet motor. Heretofore, the inhibitor strips made of plastic material were bonded to the grains by manual labor wherein the workers would wet the surfaces of both the propellant grains and the inhibitor strips with a solvent and then force the wetted surfaces together. As a result production rate was very low, a not too satisfactory bond was obtained for the reason that air bubbles prevailed and could be removed only with difficulty. Furthermore, the solvent utilized proved to be toxic in effect to the workers making the work both unpleasant and undesirable.

A principal object of the present invention is to provide a device for bonding plastic inhibitor strips on propellant grains quickly and efficiently, eliminating all possibilities of the formation of air bubbles between the strips and surface of the grains.

A further object is to provide a device for bonding inhibitor strips which is automatic in operation and requires a minimum of supervision.

Other objects and advantages will appear in the following specification, reference being had to the accompanying drawings in which, Fig. 1 is a side elevation of the invention, parts being shown in section;

Fig. 2 is a top plan view of the apparatus;

Fig. 3 is a diagrammatic view of the fluid feed system for the inhibitor strip trays, parts being shown in section;

Fig. 4 is a cross section taken substantially on the line 4—4 of Fig. 2;

Fig. 5 is a cross section taken on the line 5—5 of Fig. 1;

Fig. 6 is a diagrammatic view of the electrical system;

Fig. 7 is a horizontal section taken substantially on 7—7 of Fig. 1;

Fig. 8 is a longitudinal section taken along one of the wetting trays showing a powder grain in place;

Fig. 9 is a longitudinal section taken along one of the bonding trays showing a powder grain in place;

Fig. 10 is a cross sectional view of a wetting tray;

Fig. 11 is a cross section taken substantially on line 11—11 of Fig. 8;

Fig. 12 is a cross sectional view of a bonding tray showing a plastic inhibitor strip in position;

Fig. 13 is a cross section taken substantially on line 13—13 of Fig. 9;

Fig. 14 is a perspective view of a wetting tray, a bonding tray, and an inhibiting strip feeder illustrating the approach of the feeder toward the bonding tray, parts being shown in section;

Fig. 15 is a cross sectional view of one of the bonding trays and its support;

Fig. 16 is a cross sectional view illustrating how the strip feeder introduces an inhibitor strip in the bonding tray;

Fig. 17 is a cross section showing the inhibitor strip in position;

Fig. 18 is a detail perspective view illustrating the return motion of the strip feeder on leaving an inhibitor strip in the bonding tray;

Fig. 19 is a plan view, partially in section, of a movable bonding tray;

Fig. 20 is a side elevation, partially in section, of the structure shown in Fig. 19;

Fig. 21 is a sectional view taken on line 21—21 of Fig. 20;

Fig. 22 is a diagrammatic illustration showing the quarter turning of a powder grain;

Fig. 23 is a perspective view diagrammatically illustrating the different stages through which a powder grain goes in accomplishing the attachment of the inhibitor strips;

Fig. 24 is a perspective view of a completely processed powder grain;

Fig. 25 is a diagrammatic view of the power transmission elements for the carrier beams.

Referring now to the drawings on which like numerals of reference are employed to designate like parts throughout the several views, and particularly to Figs. 1 and 2 thereof, there is shown a rectangular shaped stand or support indicated by the numeral 1 made up of angle iron, forming a raised platform to support the various mechanisms hereinafter described in detail. In the bottom portion of the stand 1 there is a main drain pan 2 which extends horizontally throughout the stand 1.

Directly above the drain pan 2 there are three tables 3, 4 and 5 occupying a common plane to constitute a platform, said tables being so shaped as to provide openings 5a (Fig. 2) for the rotation of the carrier beams 6. On the tables 3, 4 and 5 are mounted in a particular position, as is hereinafter explained in detail, nine wetting trays 7, nine bonding trays 8 and an initial position rest 9 for a cross sectionally cruciform propellant grain 10.

The particular position stated comprises grouping the trays in pairs of wetting and bonding trays (Fig. 2). The pairs are spaced along the machine but are laterally offset so as to be out of line. However, the trays of like kinds, that is, all wetting and bonding trays, are aligned in sets crosswise of the machine. The purpose of this dispersion of the pairs of trays is to wet and inhibit spaced spots on each flange of the powder grain but in staggered localities on all of the flanges.

The rest or support 9 consists of pairs of spaced channel irons situated at each end of the stand 1 to receive said cross sectionally cruciform propellant grain 10 as shown by Fig. 1. A guide plate 10a suitably mounted at the left side of the entrance to the machine, is abuttable by the left end of the powder grain in order to start it out in correct reference to the mechanism which must process it through the successive wetting and bonding stages.

Referring now to Figs. 8, 10, 11 and 14 in particular, each of the wetting trays 7, all of which are identical in construction and function, consists of a wetting pan 11 mounted in an enlarged overflow pan 12 having a fluid return pipe 13 connected thereto. The pipe 13 directs the flow of excess solvent into the drain pan 2. At each end of the wetting pan 11 is mounted a rubber or equivalent dam 14, which limits the wetting of the inhibitable surfaces when the powder grain is lowered into the wetting tray 7 so that the softening of the grain 10 is confined to the desired areas. The fluid solvent is maintained at a constant level to insure a uniform wetting of the inhibitable grain surface.

This is accomplished by having a feed pipe 15 communicate with a pipe line 16 connected to a solvent reservoir 17, the fluid flowing from the reservoir 17 by gravity flow at a constant rate. Adjacent to the wetting trays 7 and spaced along the longitudinal axis of the trays (Fig. 2) are grain rests 18 similar in construction to the grain support 9. The rests 18 suspend the grain 10 at that altitude in respect to the wetting tray which limits its depth of immersion approximately to the longitudinal edges of the arcuate surface of the lowermost flange (Fig. 11).

As is readily noted in Fig. 2, each of the bonding trays 8 is in alignment with a companion wetting tray 7 and in front to back spaced relation thereto. The purpose of this arrangement is to permit the identical grain surface soaked and softened by the solution in one wetting tray 7 to be treated in the neighboring bonding tray 8 where a plastic inhibitor strip 19 will become bonded to the softened grain surface by the superimposed weight of the powder grain as is hereinafter described in more detail.

Referring now particularly to Figs. 9 and 12 to 18 inclusive, the bonding trays 8 mounted on the tables 3 and 4 consist of an overflow pan 20 having an overflow discharge conduit 21 for directing the excess solvent to the drain pan 2. Within the overflow pan 20 an inner tray 22 is mounted, wherein the fluid solvent is maintained at a predetermined level, the excess overflowing into the pan 20. The inner tray 22 has an open lip construction on one side wall 23, whose function is hereinafter explained, and a pair of rubber or equivalent dams 24 at its end walls to prevent the creeping of the solvent along the grain surface past the ends of the inhibitor strip when the grain is superimposed on the strip for the bonding act.

An inlet pipe 25 is connected to the bottom wall of the inner tray and communicates with the reservoir 17 as is hereinafter more fully explained. The inhibitor strips 19 are supported in their proper bonding position by a rack 26 which is secured to the inner tray 22 by studs 27. A plurality of spring members 28 shaped to receive an inhibitor strip 19 are secured to the rack 26 by the screws 29.

The bonding trays 8' mounted on the table 5 are similar in construction to those on tables 3 and 4 except that they are mounted on a movable support 30 to accommodate grains of varying sizes and still permit the end inhibitor strips to be bonded exactly on the end portion of the powder grains. Referring now to Figs. 19-21 inclusive, the movable support 30 consists of a base member 31 to which the bonding tray 8' is secured.

A pair of shafts 33 is mounted on each side of the base member 31 and rollers 32 rotatably mounted thereon to roll along a pair of channel irons 34 secured to a sub base 35. A coil spring 36 extends between one end of the sub base member 35 and the midportion of the movable base member 31 so as to maintain the bonding tray 8' in a position to accommodate without movement the shortest powder grains. A metallic shield 37 extending upwardly from the end wall of the outer tray 20 abuts against the end portion of a propellant grain which is greater in length than the average sized grains and causes the bonding tray 8' to move outwardly to accommodate the longer grain.

The plastic inhibitor strips 19 are placed in position in the bonding trays 8 for wetting by means of an inhibitor strip feed mechanism 38 (see Figs. 1-5 inclusive and 14-18 inclusive) in each instance consisting of transverse sets of feeder racks 39 in which are stacked the plastic inhibitor strips 19. Each set of the feeders 39 is secured to a shaft 40 supported at its end portions by bearing supports 41 mounted on the frame 1. Each feeder 39 consists of a pair of opposed slotted guide bars 62 between which the inhibitor strips 19 are placed. Matching openings 63 posteriorly of and on the bottom portions of each of the guide bars 62 are sufficiently large to permit only one inhibitor strip to escape therethrough freely.

As shown by Figs. 16-18 inclusive, as the feeder rack 39 swings downwardly into proximity of the bonding tray 8, the inhibitor strips 19 in the rack 39 are cammed upwardly slightly (Fig. 16) by the leading flat portions of the springs 28. When the feeder rack reaches the vertical position (Fig. 17) the inhibitor strip stack drops into the spring cradle. Now, as the feeder rack 39 swings upwardly in a direction away from the bonding tray 8, the bottom inhibitor strip in the feeder rack 39 is cammed from under the stack and out through the opening 63 by the obstruction of the narrow side 19a by the shoulders 28a of the spring members 28 (Fig. 18). Since the opening 63 is large enough only for one inhibitor strip to pass therethrough it can be readily seen that only a single inhibitor strip can be placed in tray 8 at any one time.

Each of the shafts 40 on which the feeder racks 39 are mounted has a gear wheel 42 secured at one end thereof in mesh with a gear wheel 43 formed in a slide bar 44 slidably mounted on a plurality of blocks 45. An arm 40a attached to the free end of each of the shafts 40 carries a counterweight 40b which provides a counter clockwise turning movement of the shaft slightly less than the clockwise movement of the feeder rack 39 so that the feeder rack 39 has a slight tendency to rotate clockwise or to its upright position.

A cam follower 47 which is secured to one end of the slide bar 44 abuts against a cam 48 and is operated thereby, being kept in engagement by the weight of the feeder racks. The cam follower 47 periodically enters a recess in the periphery of the cam 48, and when it does each rack 39 gravitates to its upright position (dotted lines, Fig. 3). The cam 48 is mounted on a shaft 49 at one end portion of which a sprocket wheel 50 is mounted which is engaged by a chain drive 51. The feeder mechanism 38 is operated by an electric motor 52 mounted on the stand 1a below the pan 2. A belt 53 connects a power pulley 54 mounted on the motor shaft 55 with a pulley 56 mounted on a shaft 57 having a worm 58 mounted thereon which meshes with a worm gear 59 housed within a gear wheel housing 59a. A shaft 60 on which is mounted the gear wheel 59 has a sprocket wheel 61 mounted thereon which engages the chain drive 51.

The shaft 57 on which is mounted the worm 58 is connected to a shaft 65 by a ball and socket universal joint 64. The other end of the shaft 65 is connected to a shaft 67 by a second universal joint 66. The shaft 67 has a worm 68 mounted thereon in mesh with a worm gear 69 secured to a shaft 70. At the ends of each of the shafts 60 and 70 there are mounted crank arms 71, the crank pins 71a of each of which are rotatably secured to the extreme ends of the grain carrier beams 6.

The carrier beams 6 consist of two I-beams operated by the synchronized crank shafts 60, 70 and have a plurality of half-round saddles 76 mounted thereon for supporting the propellant grains 10 as the carrier beams 6 are rotated counterclockwise (Fig. 1). The saddles lift a given grain from the rests 9 and deposit it in each of the succession of trays. Since the end of the arcuate depositing movements is characterized by a high angle of approach, the grain enters the trays without splashing the solvent. The crank shafts and carrier beams thus constitute rotating transfer means operating between each tray and rest. Since only the upper portion of the rotary motion of the transfer means is utilized, the powder grain partakes of an undulating motion, at the nodal points of which the succeeding wetting and inhibiting trays are located. Stationary arms 73, 74 and 75 mounted on the table 4 are of such height that, as the grains 10 are carried by the saddles 76 and move past the arms 73, 74 and 75, the lower portions of the grains impinge on the tips of the arms causing the grain 10 to rotate a quarter turn in its then supporting saddle (Fig. 22).

Attached to the lower surface of the drain pan 2 there is a solvent collecting sump 77. A drain opening 78 in the drain pan 2 permits the excess solvent which overflows from the trays 7 and 8 into the drain pan 2 to return to the sump 77. A pipe 79 which connects the sump 77 and the pump 80 operated by a belt drive 81 extending between the motor 52 and the pump 80 permits the solvent to be pumped thru a pipe 82 to the reservoir 17 (see Figs. 1, 3 and 5). A return flow pipe 83 connects the reservoir 17 and an inlet 85 of a three way valve 84. Outlet 86 of the valve 84 is connected by a pipe 87 and its branches with each of the bonding trays. Another outlet 88 of the valve discharges into the drain pan 2. When the valve is in the position shown in Fig. 3, fluid solvent is directed to each of the bonding trays to submerge the previously entrapped inhibitor strips (Fig. 12). A powder grain 10 is presently superimposed on the waiting, submerged inhibitor strip (Fig. 13). Upon departure of the powder grain with its bonded inhibitor strip, the valve 84 is rotated clockwise to its second position.

The solvent flow from the reservoir 17 to the bonding trays is arrested, and the solvent present in the trays up to this time drains into the pan 2, leaving the bonding trays empty of solvent. For these purposes, the valve 84 is operated by a valve lever 89 with which is connected an arm 90 (Fig. 3) having a cam follower 91 at its free end. Said follower remains in engagement with the perimeter of a cam 92 on the cam shaft 49. The cam 48 which actuates the feeder racks 39 is so related to the cam 92 that the downward movement of the feeder racks for the emplacement of the inhibitor strips in the bonding trays is delayed until said trays are drained of solvent.

This drainage is desirable from the standpoint that because of the effective length of the feeder racks, their lower free ends approach the inhibiting trays at a low angle. The trays having been drained as stated above, the inhibitor strips are introduced into the trays and deposited on the spring cradles without splashing the solvent. When the feeder racks have swung away from the trays 8, the fluid solvent is permitted to make its return flow thru the valve 84 and into the inhibiting trays 8 to immerse the entrapped inhibitor strips.

The operation is readily understood. Except for the initial starting and final stopping of the machine by a manual switch 93 (see Fig. 6), the working of the device is entirely automatic. A micro switch 94 secured to the stand 1 above the cam shaft 49 is operated by a lever or arm 99 secured to the shaft 49. When the beams 6 reach their lowermost positions at the ends of each cycle of operation, the lever 99 opens the micro switch 94 breaking the circuit within the time mechanism 95.

After a predetermined period, the timer 95 (whose construction and operation is old and well known in the art) causes the micro switch to close the circuit and the starter 96 of the motor 52 to recommence the cycle of operation. The reason for stopping the operation of the machine as above indicated is to permit the grains 10 to remain immersed in the fluid solvent within the wetting trays 7 and the bonding trays 8 a sufficient period of time respectively to permit a proper prewetting and softening of the grain surface and then to effect an under solvent union of the grain and strips, thus insure a proper bonding of the inhibitor strips to the grains.

As shown by Fig. 23, a grain 10 is first placed in its initial position on the grain support 9. As the transfer means, namely the carrier beams 6, rotate, the right extreme saddles 76a (Fig. 2) pick up the grain 10 in the upward swing of the beams and deposit it in the rests 18 of the first set of wetting trays 7a. As the carrier beams 6 swing downwardly to their lowermost positions, the micro switch 94 is opened and the beams 6 stop for a predetermined time (which may be varied as desired), during which portions of the lowermost flange of the grain are softened as stated (Fig. 11). Thereupon the beams 6 again rotate causing the saddles 76b to pick up the grain 10 from the wetting trays 7a and superimpose it on the inhibitor strip previously deposited on the rack 26 of the first set of temporarily solvent-filled bonding trays 8a. The micro switch 94 is again opened for a predetermined time while the immersed inhibitor strip 17 becomes bonded to the grain 10. Since the inhibiting trays lack the equivalents of the rests 18 from which the powder grain is suspended at the wetting trays 7, said powder grain is permitted to impose its weight upon the inhibiting strips, expelling any air bubbles between the grain and strips and producing the desired close bond. Again the carrier beams 6 swing upwardly and the third set of saddles 76c picks up the grain 10, and as it swings past the stationary arm or finger 73, the grain 10 is given a quarter turn (Fig. 22) so that a second surface of the grain 10 is placed in position to be wetted and an inhibitor strip bonded thereto. At this point, the grain is placed in the wetting trays 7b where it remains for a predetermined time and becomes properly wetted when the saddles 76d pick up the grain 10 and deposit it in the second bonding trays 8b.

As the saddles 76e now pick up the grain the finger 74 causes the grain to rotate another quarter turn, and the grain 10 is deposited on the third set of wetting trays 7c. This operation continues by a successive picking up of the grain by the cradles 76f, 76g, 76h, 76i and 76j until all four sides of the cruciform shaped propellant grain 10 have been wetted and the inhibitor strips bonded thereto at which time the grain is placed on the trays 97 where the excess solvent is permitted to drip from the grain back to the drain pan 2. As the carrier beams 6 lift the grain 10 from the trays 97, the grain is deposited on a conveyor belt system 98 where it is carried away from the machine.

As can be readily seen another conveyor belt could be used to bring the grains to the initial position trays 9. The machine would then only require one operator to fill the feeder racks 39 with inhibitor strips and to generally supervise the operation of the machine. As presently contemplated, a second operator places the grains 10 on the initial rest position trays 9. The number of grains properly inhibited per hour by the machine is determined by the time delay set in the machine between each rotative movement of the carrier beams 6. As currently planned the machine in utilizing a time delay of approximately twenty seconds will cause 100 grains per hour to become properly inhibited.

While the invention has been described with reference to a certain preferred example thereof which gives satisfactory results, it will be understood by those skilled in the art to which the invention pertains, after understanding the invention that various changes and modifications may be made without departing from the spirit and scope of the invention, and it is my intention, therefore, to cover in the appended claims all such changes and modifications.

The invention described herein may be manufactured and used by or for the Government of the United States of America for governmental purposes without the payment of any royalties thereon or therefor.

I claim:

1. In a machine for applying inhibitor strips to powder grains, a solvent-containing tray, a support for a powder grain, and means for lifting the powder grain from the support and lowering it into the tray at a relatively high angle of approach to avoid splashing the solvent.

2. In a machine for applying inhibitor strips to powder grains, a solvent-containing tray, a support for a powder grain, and rotating transfer means operating between the support and tray to lift the powder grain from the support and lower it into the tray at a relatively high angle of approach to avoid splashing the solvent.

3. In a machine for applying an inhibitor strip to a powder grain, a support for the powder grain, a solvent-containing tray distanced from the support, means for lifting the powder grain from the support and lowering it into the tray, and rests in line with the tray suspending the powder grain at a determined altitude to limit the depth of immersion of the powder grain.

4. In a machine for applying an inhibitor strip to a cross sectionally cruciform powder grain, a support for the powder grain, a solvent-containing tray distanced from the support, means for lifting the powder grain from the support and lowering it into the tray, and rests in line with the tray, being shaped to conform to part of the cruciform configuration of the powder grain to suspend the powder grain at that altitude whereat the depth of immersion of the powder grain is limited to the edges of the lowermost flange of the cruciform.

5. In a machine for applying an inhibitor strip to a cross sectionally cruciform powder grain, at least two trays spaced longitudinally of the machine, transfer means movable between the trays for transferring a powder grain from a position in one tray to a position in the second tray, and an obstruction between the trays and in the path of the powder grain, being engageable by a flange of the cruciform to turn the powder grain as it approaches the second tray.

6. In a machine for applying an inhibitor strip to a cross sectionally cruciform powder grain, at least two trays spaced longitudinally of the machine, transfer means movable between the trays and having saddles in which the powder grain rides in its transfer by said means from a position in one tray to a position in the second tray, and an obstruction between the trays and in the path of the powder grain, being engageable by a flange of the cruciform to turn the powder grain in the saddles prior to emplacement of the grain in the second tray.

7. In a machine for applying an inhibitor strip to a powder grain, at least two trays in spaced relation, a solvent supply and means for the control of its flow to the trays so that a solvent level is maintained in one tray and the second tray is periodically filled to a determined level and then drained, rests in line with said one tray on which a powder grain is suspended at a determined altitude to limit the depth of immersion of the powder grain, a rack in the second tray to support an inhibitor strip, and transfer means for lifting the grain from the rests and superimposing it on an inhibitor strip on the rack during the solvent-filled period of the second tray.

8. In a machine for applying inhibitor strips to powder grains, means for transporting powder grains through the machine with an undulating motion, solvent trays located at the nodal points of the undulations, a solvent supply, a control for the solvent maintaining a constant solvent level in alternate trays and causing a successive filling and drainage in the intermediate trays, and means by which inhibitor strips are introduced into the intermediate trays during the period of drainage and in advance of both the refilling of the intermediate trays and the transfer thereto of the powder grains initially wetted in the alternate trays.

9. In a machine for applying inhibitor strips to powder grains, a bonding tray containing a rack, feed mechanism for periodically emplacing an inhibitor strip on the rack preparatory to the super-imposition thereon of successive powder grains, and solvent flow-control means for filling the tray to flood the strips in the interim between strip emplacements.

10. In a machine for applying inhibitor strips to powder grains, a bonding tray containing a rack, feed mechanism movable toward and from the tray for emplacing an inhibitor strip on the rack on each arrival of the mechanism at the tray, and solvent flow-control means for filling the tray to flood the strips during the recession of the feed mechanism.

11. In a machine for applying inhibitor strips to powder grains, a bonding tray containing a rack, feed mechanism swingable above the tray, first down to a position over the rack to emplace an inhibitor strip thereon and then to recede, and solvent flow-control means for filling the tray to flood the strip during the recession of the mechanism and to drain the tray on the down swings to avoid splashing the solvent.

12. In a machine for applying inhibitor strips to powder grains, a bonding tray containing a rack, a swingable inhibitor strip feed mechanism and a swingable powder grain transfer means, converging upon the tray in alternation respectively to emplace an inhibitor strip and a powder grain in that order on the rack, and solvent flow-control means for filling the tray between the instants of emplacement of the strip and powder grain.

13. In a machine for applying inhibitor strips to powder grains, at least two trays in spaced relation, one tray having a constant solvent level and an adjacent powder grain rest the second tray being periodically filled and drained, feed mechanism emplacing an inhibitor strip in the second tray during a period of drainage to remain submerged therein during the subsequent filling, and transfer means for transplacing a powder grain from said one tray whereat it has limited immersion because the levitation of its weight by the rests to superimposition on the strip in the second tray with its full weight.

14. In a machine for applying inhibitor strips to powder grains, a tray to contain a solvent in which a portion of a powder grain is immersible, and yieldable dams in the tray on which the powder grain is superimposed, being spaced at prescribed distances to limit the wetting of said portion.

15. In a machine for applying inhibitor strips to powder grains, a tray to contain a solvent in which a portion of a flange of a cross sectionally cruciform powder grain is immersible, and yieldable dams in the tray cut out to accommodate the flange when superimposed thereon and closing in on the flange to limit the wetting of said portion.

16. In a machine for applying inhibitor strips to powder grains, a tray to contain a solvent in which a portion of a powder grain is immersible, spaced yieldable dams in the tray on which the powder is superimposed to limit the wetting of said portion, and means on which the powder grain is rested to prevent imposition of its full weight on the dams.

17. In a machine for applying inhibitor strips to powder grains, a tray to contain a solvent in which a portion of a powder grain is immersible, spaced yieldable dams in the tray on which the powder grain is superimposed to limit the wetting of said portion, and rests outside of and in line with the ends of the tray supporting the powder grain to limit the immersion of said portion and prevent imposition of the full weight of the powder grain on the dams.

18. In a machine for applying inhibitor strips to powder grains, a tray to contain a solvent in which a portion of a powder grain is immersible, spaced yieldable dams in the tray on which the powder grain is superimposed to limit the wetting of said portion, and an inhibitor strip-supporting rack in the tray, to which the weight of the powder grain is transferable to prevent imposition of the full weight of the powder grain on the dams.

19. In a machine for applying inhibitor strips to powder grains, a bonding tray containing a rack, feed mechanism to carry a stack of inhibitor strips, being swingable toward and recessive from the rack, and means included in the rack to obstruct the bottom strip on the recession of the feed mechanism to leave said strip emplaced on the rack.

20. In a machine for applying inhibitor strips to powder grains, transfer means for bringing a powder grain to an inhibitor strip-bonding position, and receiving means for the powder grains in said position in which the weight of the powder grain is utilized to adhere an inhibitor strip thereto.

21. In a machine for applying inhibitor strips to powder grains, transfer means for bringing a powder grain to a bonding position, feed mechanism to carry an inhibitor strip into coincidence with said position, and common solvent-containing receiver means in said position at which the emplacement of an inhibitor strip by the feed mechanism and the imposition thereon of a powder grain by the transfer means occur in serial order.

22. In a machine for applying inhibitor strips to powder grains, a bonding tray containing a rack, feed mechanism to carry a stack of inhibitor strips, being swingable toward and recessive from the rack, and shouldered spring members included in the rack, the shoulders camming the stack upward on the down-swing of the feed mechanism and obstructing the bottom strip on recession to leave said strip emplaced in the spring members.

23. In a machine for applying inhibitor strips to powder grains, a bonding tray containing a rack, feed mechanism to carry a stack of inhibitor strips, being swingable toward and recessive from the rack, said mechanism including slotted guide bars for the strips having matching posterior openings through which the bottom strips escape, and means included in the rack to obstruct said bottom strip on the recession of the feed mechanism to leave said strip on the rack.

24. In a machine for applying inhibitor strips to powder grains, a platform having openings, a series of wetting and bonding trays spaced along the platform, rests in line with the wetting trays, and rotary powder grain transfer means working through the openings, having saddles for the powder grains and being rotated intermittently so that the saddles perform an undulating motion above the platform thereby to deposit a given powder grain on the rests and in the bonding trays in succecssion.

25. In a machine for applying inhibitor strips to powder grains, a platform having openings, a series of trays spaced along the platform in which successive wetting and bonding functions are performed, intermittently rotating powder grain transfer means working through the openings to pick up powder grains and therefore transport them with an undulating motion from tray to tray, feed mechanism for emplacing inhibitor strips in each bonding tray in advance of the arrival thereat of a powder grain, a solvent supply for the trays, maintaining a constant level in the wettings trays, and means common to the solvent supply and the feed mechanism, working in time therewith respectively to fill the bonding trays and then drain them and to emplace inhibitor strips in the bonding trays prior to each filling and arrival of a powder grain.

26. In a machine for applying inhibitor strips to powder grains, a bonding tray, a solvent supply communicating with the bonding tray and having a valve through which to fill said tray therefrom, feed mechanism to deposit an inhibitor strip in the tray, and operating means common to the valve and feed mechanism for actuating the feed mechanism and valve in succession.

27. In a machine for applying inhibitor strips to powder grains, a plurality of pairs of wetting and bonding trays spaced along the machine, the pairs being in laterally offset relation to each other so as to be out of line lengthwise of the machine, the trays of like kinds being aligned in sets crosswise of the machine, transfer means for transporting a cross sectionally cruciform powder grain from set to set with a step motion to successively wet and inhibit spaced spots on a given flange of the cruciform, and means for imparting a fractional turn to the powder grain during transit from pair to pair thereby to stagger the wetting and inhibiting of such spots on all of the flanges.

28. In a machine for applying inhibitor strips to powder grains, transfer means for transporting a cross sectionally cruciform and uniformly long powder grain through the machine accompanied by periodic turning, plural pairs of stationary wetting and bonding trays at which the powder grain is periodically stopped between turnings for the application of a plurality of inhibiting strips, and a movable mounting for at least one of the pairs of trays, being automatically moved by an end of the powder grain if of excess length when emplaced in said pair of trays, thereby to insure application of the final inhibitor strip flush with said end.

29. In a machine for applying inhibitor strips to powder grains flush with the ends and at spots medially thereof, intermittently operable transfer means for transporting and periodically turning powder grains of generally uniform length through the machine, spaced stationary wetting and bonding trays at which the powder grain is stopped for medial wetting and inhibiting, including at least one pair of trays at which wetting and inhibiting is done flush with one end of the powder grain, a similar pair of trays for wetting and inhibiting the powder grain flush with the other end, and a movable mounting for said similar pair of trays, being yieldable to accommodate a powder grain of excess length.

30. In a machine for applying inhibitor strips to powder grains, a bonding tray in which an inhibitor strip is bonded to a powder grain, a feeder rack in which the strips are stacked, being swingable by gravity into the bonding tray to deliver a strip, a turnable cam having a recess, and a follower connection from the feeder rack bearing on the periphery of the cam by part of the weight of the rack behind it and periodically entering the recess.

31. In a machine for applying inhibitor strips to powder grains, a bonding tray in which an inhibitor strip is bonded to a powder grain, a feeder rack in which the strips are stacked, being swingable by gravity into the bonding tray to deliver a strip, a follower having a rack and gear connection with the feeder rack tending to respond with motion in one direction by action thereon of gravity on the feeder rack, and a turnable cam against which the follower means bears to resist said motion, said cam having a recess which said follower may enter.

32. In a machine for applying inhibitor strips to powder grains, transfer means for transporting powder grains of generally identical length through the machine, wetting and bonding trays with which the powder grains coincide periodically for the bonding of inhibitor strips thereon, a guide plate fixed at the entrance to the machine, against which one end of each powder grain is abuttable to properly register the powder grains with the trays at the beginning of transportation, and a mounting for the tray which the opposite ends of the powder grains are registrable, said mounting being movable by engagement therewith of the opposite end of a powder grain of excess length to automatically move said tray out to insure application of the respective inhibitor strip flush with said opposite end.

BERT M. SWEETSER.

REFERENCES CITED

The following references are of record in the file of this patent:

UNITED STATES PATENTS

| Number | Name | Date |
| --- | --- | --- |
| 527,628 | Thomas | Oct. 16, 1894 |
| 2,015,929 | Goodwin | Oct. 1, 1935 |
| 2,341,198 | Weiskopf | Feb. 8, 1944 |
| 2,372,755 | Abell | Apr. 3, 1945 |